US 12,222,265 B1
Feb. 11, 2025

(12) United States Patent
Wagner

(54) SYSTEMS AND METHODS FOR ACTUATOR BACKLASH MEASUREMENT AND MONITORING

(71) Applicant: Archer Aviation Inc., San Jose, CA (US)

(72) Inventor: Kurt James Wagner, Los Gatos, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/825,203

(22) Filed: Sep. 5, 2024

Related U.S. Application Data

(63) Continuation of application No. 18/622,342, filed on Mar. 29, 2024, now Pat. No. 12,123,810.

(51) Int. Cl.
    *G01M 99/00* (2011.01)
    *B64F 5/60* (2017.01)

(52) U.S. Cl.
    CPC ............ *G01M 99/008* (2013.01); *B64F 5/60* (2017.01)

(58) Field of Classification Search
    CPC .. G01M 99/008; G01M 13/021; G01M 13/02; G01M 13/04; G01M 1/125; G01M 9/06; G01M 9/04; G01M 7/025; B64F 5/60; F16H 57/12; B60W 10/11; F16D 25/126; F16D 2500/7041; H04B 10/0775; H04B 17/101; G01B 21/16; G01B 5/14; G01B 7/14; G01B 11/14; G01B 5/202; G01B 5/146; G01B 5/166; G01B 5/0025; G01B 11/2416; G01B 7/146; G01B 7/283
    See application file for complete search history.

(56) References Cited

U.S. PATENT DOCUMENTS

| 7,283,934 | B2 | 10/2007 | Deller et al. |
| 7,292,954 | B2 | 11/2007 | Deller et al. |
| 8,197,205 | B2 | 6/2012 | Rudley et al. |
| 8,511,192 | B2 | 8/2013 | Hirtt et al. |

(Continued)

FOREIGN PATENT DOCUMENTS

CN 113639622 A 11/2021

*Primary Examiner* — Eric S. McCall
*Assistant Examiner* — Anthony W Megna Fuentes
(74) *Attorney, Agent, or Firm* — Finnegan, Henderson, Farabow, Garrett & Dunner, LLP

(57) ABSTRACT

Systems and methods for backlash measurement and monitoring are disclosed for an actuator having a motor end and an output end. The method may include: driving the motor end of the actuator to one endpoint; measuring, using a first sensor, a motor-end initial position value associated with the motor end; measuring, using a second sensor, an output-end initial position value associated with the output end; driving the motor end of the actuator to another endpoint; measuring a motor-end final position value using the first sensor and an output-end final position value using the second sensor; determining a backlash value based on the motor-end initial position value, output-end initial position value, motor-end final position value, and output-end final position value; generating a signal based on comparing the backlash value to a predetermined threshold; and displaying a notification indicative of an operational condition of the actuator based on the signal.

30 Claims, 9 Drawing Sheets

(56) References Cited

U.S. PATENT DOCUMENTS

| | | |
|---|---|---|
| 9,227,738 B2 | 1/2016 | Wittmaak et al. |
| 11,385,139 B2 | 7/2022 | Best |
| 11,761,851 B1 | 9/2023 | Gohil et al. |
| 2023/0313875 A1 | 10/2023 | Tanila et al. |
| 2024/0208645 A1 | 6/2024 | Ahyow |

SYSTEMS AND METHODS FOR ACTUATOR BACKLASH MEASUREMENT AND MONITORING

CROSS-REFERENCE TO RELATED APPLICATION

The present application is a continuation of U.S. application Ser. No. 18/622,342 filed on Mar. 29, 2024, the entire contents of which are incorporated herein by reference.

TECHNICAL FIELD

This disclosure relates generally to the field of electromechanical systems. More particularly, and without limitation, the present disclosure relates to innovations in measuring and monitoring actuator backlash in the field of electromechanical systems, including powered aerial vehicles. Certain aspects of the present disclosure generally relate to systems and methods for actuator backlash measurement and monitoring in aircrafts driven by electric propulsion systems and in other types of vehicles, as well as aircrafts in flight simulators and video games. Other aspects of the present disclosure generally relate to improvements in actuator backlash measurement and monitoring systems and methods that provide particular advantages in aerial vehicles and may be used in other types of electromechanical systems.

BACKGROUND

The inventors here have recognized several problems that may be associated with actuators in electromechanical systems, such as an aircraft, including a tilt-rotor aircraft that uses electrical or hybrid-electric propulsion systems (hereinafter referred to as electric propulsion units or "EPUs"). Actuators have a finite service life, which can be limited by the actuator's backlash. Backlash refers to an amount of movement required to account for gaps or clearances between parts in a mechanism. For example, when two gears mesh with each other, there may be small gaps between the intermeshing gear teeth. When one of the two gears is rotated, that gear must rotate by the amount of the small gaps between the gear teeth before the gear teeth of the intermeshing gears may come in contact with each other. The amount of rotation of the gear to account for the small gaps constitutes the backlash in the intermeshing gears.

Some safety- or performance-critical actuators, such as those in aircraft or surgical robots, can only tolerate a specific range of backlash while remaining reliable and safe for use. The specific range may be small. Further, the rates of change of backlash over time for similar actuators in different parts of the system may be different. There may be an acceptable range of backlash values that may reasonably guarantee safe operation of a system. In some systems, actuators may be repaired or replaced at regular intervals (e.g., every month, every year, etc.) even before some or all of their backlash values exceed the acceptable range of backlash values. However, because it is costly and time consuming to replace actuators more regularly than necessary, replacing actuators having backlash values within the acceptable range may unnecessarily increase a cost of operation of the actuators. Therefore, there is a need for regular, accurate measurement and monitoring of actuator backlash to ensure that each actuator is acceptable for use and only actuators that have unacceptable backlash are repaired or replaced. Doing so may further prevent acceptable actuators from being unnecessarily discarded.

SUMMARY

Aspects of this present disclosure relate to measuring and monitoring actuator backlash. More particularly, and without limitation, the present disclosure relates to flight control of electric aircraft and other powered aerial vehicles, as well as innovations in tilt-rotor aircraft that use electrical propulsion systems. For example, certain aspects of the present disclosure relates to measuring and monitoring actuator backlash. Further, certain embodiments may command an aircraft based on a measured actuator backlash.

One aspect of the present disclosure is directed to an actuator backlash measurement and monitoring method for an aircraft, the actuator comprising a motor end and an output end, comprising: driving the motor end of the actuator to one endpoint; measuring, using a first sensor, a motor-end initial position value associated with the motor end of the actuator; measuring, using a second sensor, an output-end initial position value associated with the output end of the actuator; driving the motor end of the actuator to another endpoint; measuring, using the first sensor, a motor-end final position value associated with the motor end of the actuator; measuring, using the second sensor, an output-end final position value associated with the output end of the actuator; determining a backlash value of the actuator based on at least the motor-end initial position value, the output-end initial position value, the motor-end final position value, and the output-end final position value; generating a comparison of the backlash value and at least one predetermined threshold; generating a signal based on the comparison; and displaying, on a display device, a notification indicative of an operational condition of the actuator based on the signal.

Another aspect of the present disclosure is directed to an actuator backlash measurement and monitoring method for an aircraft, the actuator comprising a motor end and an output end, comprising: at least one processor and at least one non-transitory computer-readable medium containing instructions that, when executed by the at least one processor, causes the at least one processor to perform operations comprising: driving the motor end of the actuator to one endpoint; measuring, using a first sensor, a motor-end initial position value associated with the motor end of the actuator; measuring, using a second sensor, an output-end initial position value associated with the output end of the actuator; driving the motor end of the actuator to another endpoint; measuring, using the first sensor, a motor-end final position value associated with the motor end of the actuator; measuring, using the second sensor, an output-end final position value associated with the output end of the actuator; determining a backlash value of the actuator based on at least the motor-end initial position value, the output-end initial position value, the motor-end final position value, and the output-end final position value; generating a comparison of the backlash value and at least one predetermined threshold; generating a signal based on the comparison; and displaying, on a display device, a notification indicative of an operational condition of the actuator based on the signal.

Yet another aspect of the present disclosure comprises a method for actuator backlash measurement and monitoring, the actuator comprising a motor end and an output end, comprising: driving the motor end of the actuator to one endpoint; measuring, using a first sensor, a motor-end initial position value associated with the motor end of the actuator; measuring, using a second sensor, an output-end initial position value associated with the output end of the actuator; driving the motor end of the actuator to another endpoint; measuring, using the first sensor, a motor-end final position value associated with the motor end of the actuator; measuring, using the second sensor, an output-end final position value associated with the output end of the actuator; determining a backlash value of the actuator based on at least the motor-end initial position value, the output-end initial position value, the motor-end final position value, and the output-end final position value; generating a comparison of the backlash value and at least one predetermined threshold; generating a signal based on the comparison; and displaying, on a display device, a notification indicative of an operational condition of the actuator based on the signal.

Systems and computer-readable media (such as non-transitory computer-readable media) that implement either or both of the above methods are also provided.

Additional objects and advantages of the embodiments will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

DETAILED DESCRIPTION

The present disclosure addresses systems, components, and techniques primarily for use in electromechanical systems. The electromechanical systems may include Computer Numerical Control (CNC) machines, industrial robots (e.g., assembly, material handling), medical imaging systems (e.g., Magnetic Resonance Imaging), surgical robots, satellite attitude control systems, an aircraft with a pilot, an aircraft without a pilot (e.g., an un-manned aerial vehicle or "UAV"), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven by one or more electric propulsion systems (hereinafter referred to as electric propulsion units or "EPUs"). The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Excessive backlash associated with one or more actuators of the aircraft may make aircraft operations unsafe or may induce an undesirable amount of noise and/or vibration during aircraft operations. Accordingly, it is desirable to accurately monitor and measure actuator backlash in a manner that ensures each actuator is safe or acceptable for use and used for its entire lifetime, while providing a low noise, low vibration, and safe flight experience to passengers.

Reference will now be made in detail to exemplary embodiments, examples of which are illustrated in the accompanying drawings. The following description refers to the accompanying drawings in which the same or similar numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 1:
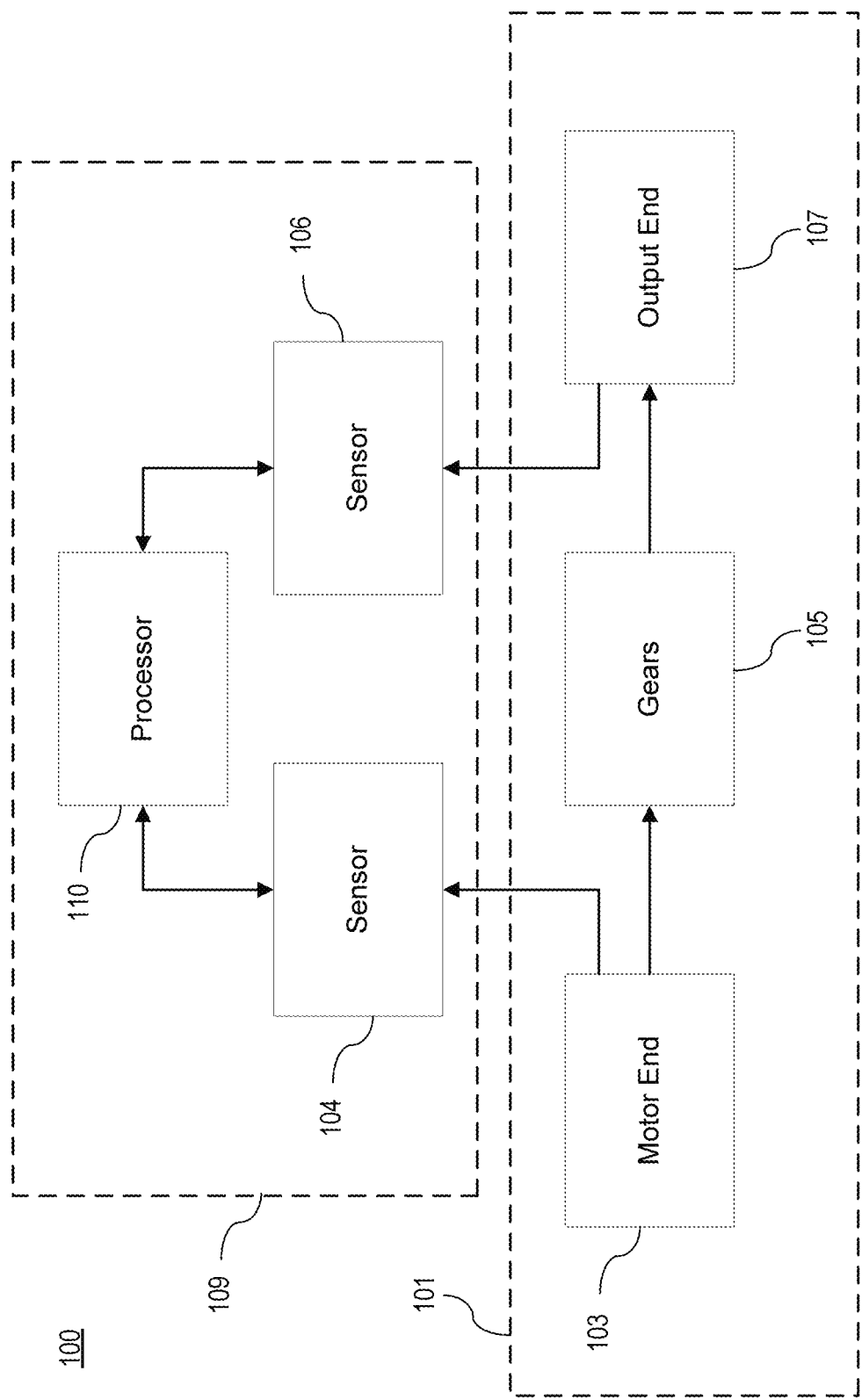
FIG. 1 shows an exemplary actuator backlash measurement and monitoring system, consistent with disclosed embodiments.

FIG. 1 is a block diagram 100 of an exemplary actuator backlash measurement and monitoring system, consistent with disclosed embodiments. FIG. 1 illustrates actuator 101 and backlash measurement and monitoring system 109. In some embodiments, actuator 101 may include a motor end 103, gears 105, and an output end 107. Motor end 103 may refer to an input shaft of a machine designed to convert one or more forms of energy into mechanical energy. For example, motor end 103 may be implemented as an input shaft of a linear motor or a rotary motor. Gears 105 may refer to any part or combination of parts that transmit motion or torque from one shaft to another. For example, gears 105 may include a single gear or a gear train in a rotary actuator, a linear screw in a linear actuator, or any other part or combination of parts that perform similar functions in rotary actuators, linear actuators, or any other kind of actuator. Output end 107 may refer to an output shaft or any other part or device that may be actuated or moved to generate motion or force within a system. For example, output end 107 may be an output shaft of an actuator connected to a control surface (e.g., flaperon, ruddervator) of an aircraft or an end effector of a robotic arm (e.g., a gripper on an assembly robot).

In some embodiments, backlash measurement and monitoring system 109 may include a first sensor 104, a second sensor 106, and a processor 110. First sensor 104 and second sensor 106 may refer to position sensors that measure the position of one or more parts. For example, first sensor 104 and second sensor 106 may be implemented as encoders, potentiometers, hall effect sensors, resolvers, or any other position sensor that may detect or measure the position of a gear, linear screw, or the like. Generally, it may be understood that first sensor 104 and second sensor 106 may be implemented as any type of sensor that is configured to measure the length, angle, or any other measure of position of one or more parts in an actuator.

In some embodiments, first sensor 104 may be operatively connected to motor end 103 and measure a position associated with motor end 103, such as the position of an input shaft or gear at motor end 103. In some embodiments, first sensor 104 may be operatively connected to the first gear in gears 105 or an equivalent part. Further, in some embodiments, second sensor 106 may be operatively connected to output end 107 and measure a position associated with output end 107. In some embodiments, second sensor 106 may be operatively connected to the last gear in gears 105 or an equivalent part and measure a position associated with gears 105. In some embodiments, first sensor 104 and second sensor 106 may be operatively connected to processor 110. For example, first sensor 104 and second sensor 106 may be configured to send measured data, such as position data, to processor 110.

In some embodiments, processor 110 may involve one or more processors configured to perform operations for actuator backlash measurement and monitoring. For example, in some embodiments, processor 110 may involve a processor dedicated to actuator backlash measurement and monitoring or a processor that may perform other operations and functions as well. Additionally or alternatively, in some embodiments processor 110 may be a flight control computer of an aircraft. Further, processor 110 may be a Human-Machine Interface (HMI) or a supervisory control and data acquisition (SCADA) for an industrial robot or medical robot. In some embodiments, processor 110 may be configured to command actuator 101. For example, processor 110 may be configured to command actuator 101 to an end or limit defined by its environment, function, or the like. Further, in some embodiments, processor 110 may be configured to first sensor 104 and second sensor 106 to record a measurement value for each of their respective associated parts, such as motor end 103 and output end 107, respectively.

In some embodiments, processor 110 may be configured to receive and store received data in a memory location. In some embodiments, processor 110 may include a memory location. Additionally or alternatively, in some embodiments, the memory location may be a separate device operatively connected to processor 110. For example, the memory location may be a separate processor, a database, or any other device capable of storing data. In some embodiments, processor 110 may be configured to recall or query stored data from the memory location. In some embodiments, the data may include data from sensors. For example, the data may include position data from sensor 104 and sensor 106.

Further, in some embodiments, the memory location may be configured to store one or more threshold values. For example, the memory location may store one or more threshold values, with each threshold value associated with a different and distinct condition of the actuator. Further, in some embodiments, each threshold value may be a numerical value associated with an amount of backlash in the actuator (e.g., 0.5 degrees, 0.7 degrees, 1 degree, 0.5 millimeters, 0.7 millimeters, 1 millimeter, or any other value that may represent an acceptable amount of backlash). In some embodiments, the one or more predetermined thresholds may include two threshold values: a first threshold value associated with a first operational condition of the actuator and a second threshold value associated with a second operational condition of the actuator. For example, the first operational condition may refer to an operational condition of the actuator indicating that the actuator is acceptable for use and may require maintenance or replacement in the future. The second operational condition may refer to an operational condition of the actuator indicating that the actuator is not acceptable for use and requires maintenance or replacement. Additionally or alternatively, the one or more predetermined thresholds may include three threshold values, the third threshold value of which may be greater than the second threshold value described above and may be associated with a third operational condition of the actuator. The third operational condition of the actuator may refer to an operational condition of the actuator indicating that the actuator has failed. Generally, it may be understood that there may be any number of threshold values that may indicate an associated number of distinct operational conditions of an actuator.

In some embodiments, each of the one or more threshold values may be determined using historical data of the actuator or a similar actuator. For example, each of the one or more threshold values may be determined based on, at least in part, historical data of an actuator's backlash value over time or backlash values over time from a model simulation, as exemplified and discussed below with respect to FIG. 3.

In some embodiments, processor 110 may be configured to determine a backlash value based on at least values measured by sensor 104 and sensor 106. For example, the values may include two values measured by sensor 104 (e.g., a motor-end initial position value and a motor-end final position value) and two values measured by sensor 106 (e.g., an output-end initial position value and an output-end final position value), all values of which may be stored in the memory location. Further, in some embodiments, processor 110 may be configured to compare the determined backlash value with the one or more predetermined thresholds. For example, processor 110 may be configured to determine if the determined backlash value exceeds any of the one or more predetermined thresholds.

In some embodiments, processor 110 may be configured to generate a signal based on the comparison. For example, processor 110 may generate a signal including data indicating that an actuator's backlash value exceeds a first predetermined threshold but does not exceed a second predetermined threshold. In some embodiments, processor 110 may be configured to display the generated signal on a display. Additionally or alternatively, in some embodiments, processor 110 may send the generated signal to another device for processing, storage, or display. For example, in some embodiments, processor 110 may be configured to display, on a display device, a notification indicative of an operational condition of the actuator.

Figure 2:
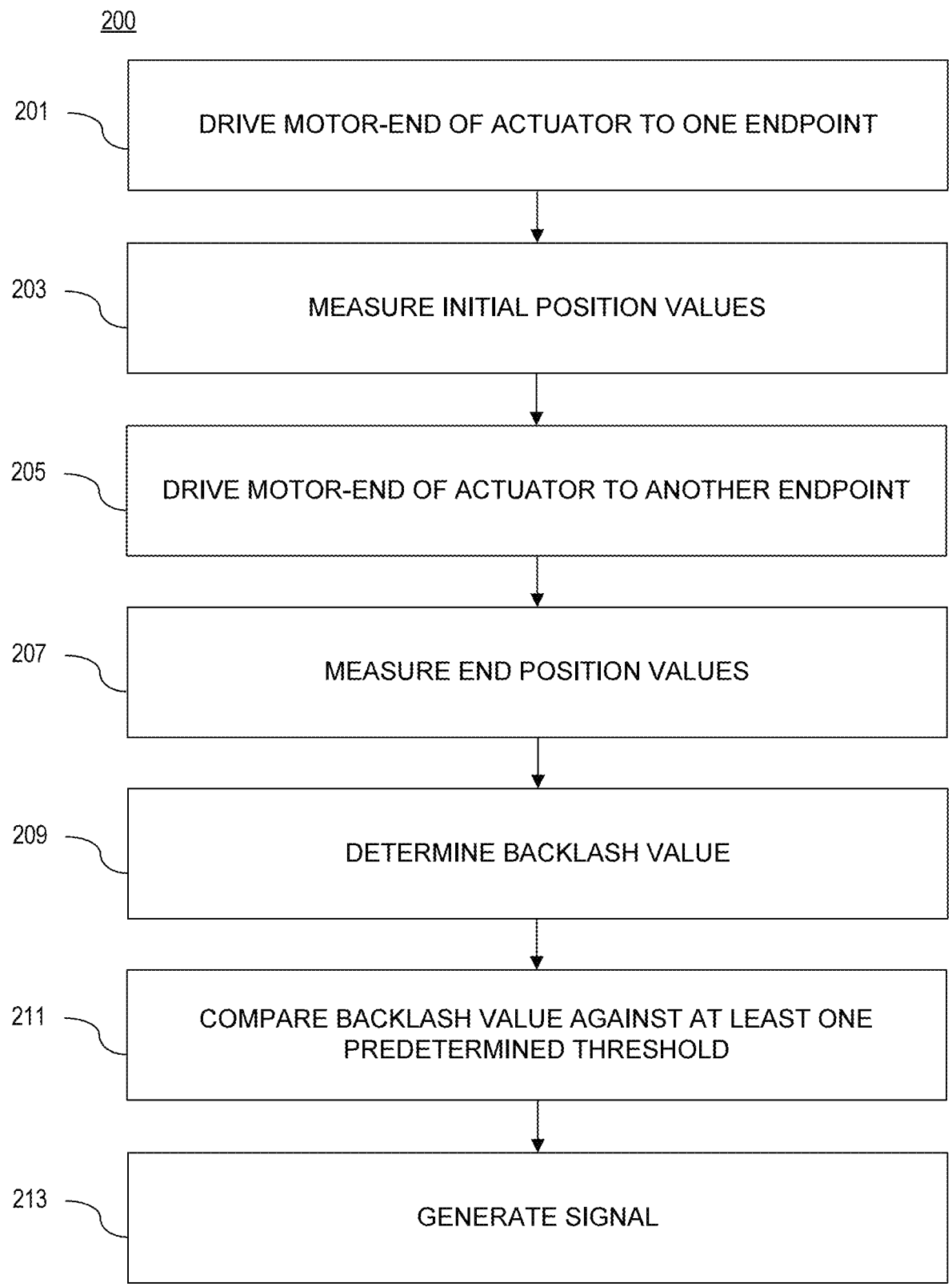
FIG. 2 shows a flowchart for an exemplary actuator backlash measurement and monitoring method, consistent with disclosed embodiments.

FIG. 2 is a flow diagram of an exemplary actuator backlash measurement and monitoring method 200, consistent with disclosed embodiments. In some embodiments, method 200 may be performed as part of a pre-use check of an electromechanical system. For example, method 200 may be performed as part of a pre-flight check of an aircraft. Further, method 200 may be performed as part of a pre-use check of an industrial robot, CNC machine, surgical robot, or any other electromechanical system that requires high precision or accuracy.

In step 201, a processor commands an actuator to drive to one endpoint. An endpoint may refer to the extreme position or limit to which the actuator is configured to move or to actuate. For example, a rotary actuator may be configured to have one endpoint at 0 degrees and another endpoint at 180 degrees. Further, a linear actuator may be configured to have one endpoint at 0 inches and another endpoint at 10 inches. In some embodiments, the processor may drive the actuator to a minimum endpoint in step 201. In other embodiments, the processor may drive the actuator to a maximum endpoint in step 201. Further, for example, a multi-position rotary actuator may be configured to have multiple endpoints based on mechanical (e.g., indexing gears, detents) or programmed (e.g., electronic positioning system) constraints. The present disclosure may be used to determine the backlash between any two given endpoints. Generally, it may be understood that the processor may drive the motor end of the actuator to any one of its endpoints in step 201.

In step 203, a processor may command one or more sensors to measure a motor-end position value. For example, processor 110 may command sensor 104 and sensor 106 to each measure a motor-end position value (i.e., motor-end initial position value and output-end initial position value, respectively). Further, processor 110 may receive and store the measured initial position values in a memory location.

In step 205, a processor may command the actuator to drive to another endpoint, the endpoint being not equal to the endpoint in step 201. For example, processor 110 may command actuator 101 to drive to drive to an endpoint that is not the same endpoint as in step 201.

In step 207, a processor may command one or more sensors to measure an output-end position value. For example, processor 110 may command sensors 104 and sensor 106 to each measure an output-end position value (i.e., motor-end final position value and output-end final position value, respectively). Further, processor 110 may receive and store the measured final position values in a memory location. In some embodiments, the memory location may be the same memory location that stores the measured initial position values.

In step 209, a processor may determine a backlash value. In some embodiments, determining a backlash value may include calculating one or more difference values by subtracting a motor-end position value from an output-end position value. For example, processor 110 may calculate a first difference value by subtracting the motor-end initial position value from the motor-end final position value. Further, processor 110 may calculate a second difference value by subtracting the output-end initial position value from the output-end final position value. In some embodiments, determining a backlash value may further include combining the one or more difference values together. Combining may include one or more of adding, subtracting, trigonometric functions (e.g., sine, cosine), or any other mathematical operation or combination thereof. For example, processor 110 may add the first difference value and the second difference value to obtain a backlash value. Processor 110 may store the first difference value, the second difference value, and the determined backlash value in a memory location.

In step 211, a processor may compare a backlash value against at least one predetermined threshold. For example, processor 110 may be configured to generate a comparison of the determined backlash value against a first predetermined threshold and a second predetermined threshold. In some embodiments, the comparison may include a number of indicator values equal to the number of predetermined thresholds. In some embodiments, the second predetermined threshold may be greater than the first predetermined threshold. Further, in some embodiments, each indicator value may indicate if the determined backlash value is greater than or equal to a corresponding predetermined threshold. For example, if the determined backlash value is 0.75 degrees, the first predetermined threshold value is 0.7 degrees, and the second predetermined threshold value is 1 degree, the comparison may include a first indicator value indicating that the determined backlash value exceeds the first predetermined threshold value (e.g., first indicator value=1) and a second indicator value indicating that the determined backlash value does not exceed the second predetermined threshold (e.g., second indicator value=0). In some embodiments, the processor may be configured to store the one or more indicator values in the memory location.

In step 213, a processor may generate a signal based on the comparison and may send the generated signal to another processor or display device. In some embodiments, the signal may include the indicator values, a command, or a notification. For example, processor 110 may generate a signal including a command to prevent an aircraft from taking off based on a comparison indicating that the determined backlash value exceeds the second predetermined threshold. Further, processor 110 may generate a signal including a command to prevent a surgical robot from operating until the actuator is repaired or replaced.

Further, in some embodiments, processor 110 may send the signal to a display device for displaying the signal. The display device may include, for example, a flight display in an aircraft; an HMI for a surgical robot; or a SCADA for a manufacturing robot. In some embodiments, the displayed signal may include a notification indicative of an operational condition of the actuator. For example, if the determined backlash value for an actuator is 0.75 degrees, the first predetermined threshold is 0.7 degrees, and the second predetermined threshold is 1 degree, the notification may indicate that the actuator is acceptable for use but may require maintenance or replacement soon (e.g., 8 hours of operation, 1 week).

Figure 3:
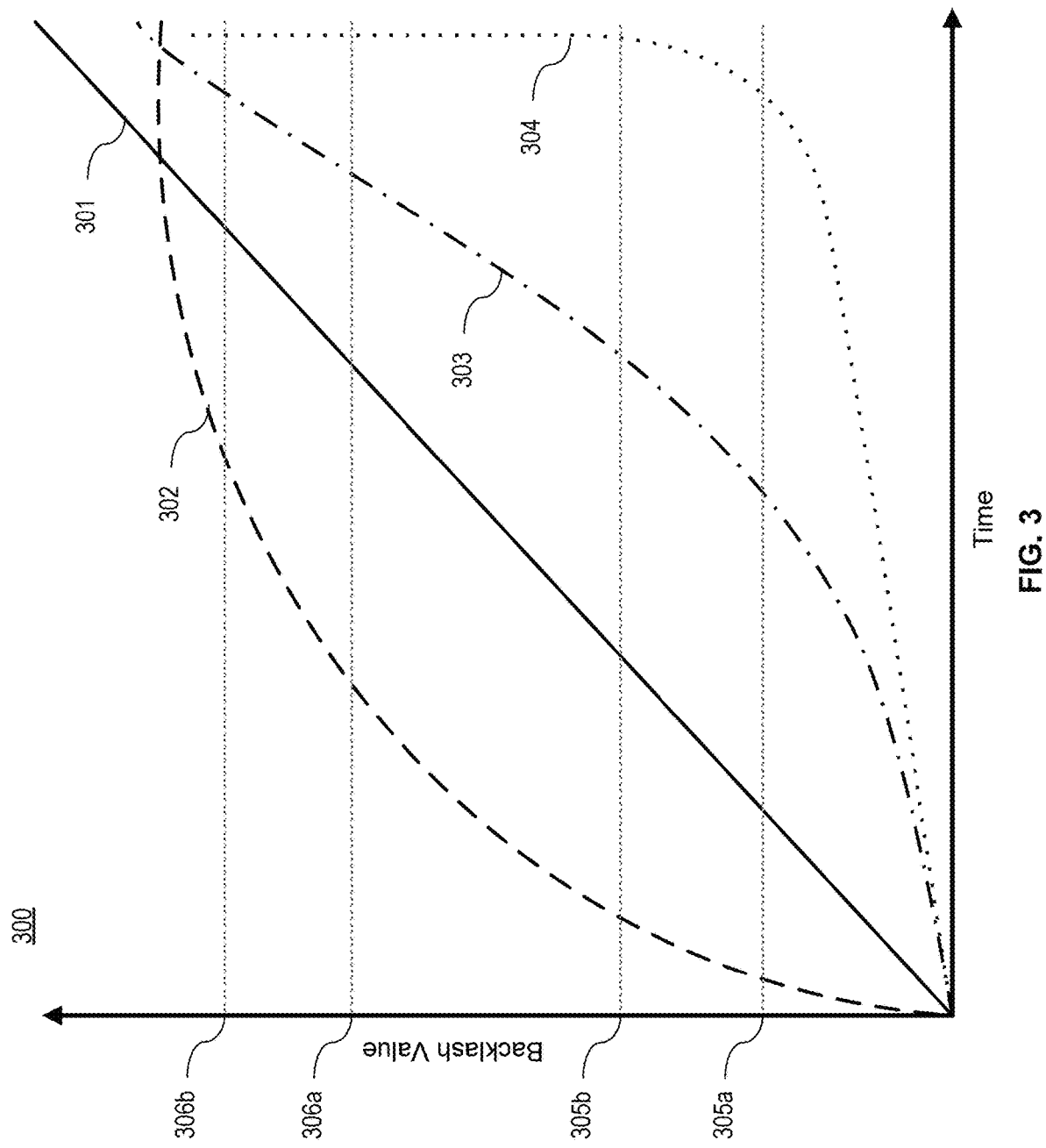
FIG. 3 shows an exemplary graph for actuator backlash measurement and monitoring, consistent with disclosed embodiments.

FIG. 3 is an exemplary graph 300 for actuator backlash measurement and monitoring, consistent with disclosed embodiments. In some embodiments, the graph may contain a curve representing backlash values of an actuator over time. For example, graph 300 may contain a backlash curve, such as curve 301, curve 302, curve 303, and curve 304. In some embodiments, a backlash curve may be generated based on historical data of an actuator. For example, a backlash curve may be generated based on measured backlash values of an actuator for an amount of time (e.g., 1 year, 5 years, or any other amount of time less than or equal to the actuator's lifetime). In some embodiments, a backlash curve may be generated based on a model simulation. For example, a backlash curve may be generated based on results of a model simulation of an actuator, for example, a Simulink simulation, flight testing, endurance testing, or any combination thereof.

In some embodiments, one or more threshold values may be determined based on a backlash curve. For example, threshold values 305a and 305b may be based on backlash curve 303. Further, threshold values 306a and 306b may be based on backlash curve 302. Generally, it may be understood that any set of one or more predetermined thresholds may be based on a backlash curve, and that different backlash curves may suggest the same or different sets of one or more predetermined thresholds. In some embodiments, the lesser threshold value (e.g., threshold values 305a and 306a) may be associated with the first predetermined threshold, and the greater threshold value (e.g., threshold values 305b and 306b) may be associated with the second predetermined threshold. In some embodiments, a processor may determine the one or more predetermined thresholds based on a backlash curve. Additionally or alternatively, one skilled in the art may read and interpret a backlash curve to determine the one or more predetermined thresholds. For example, the one or more predetermined thresholds may be based at least in part on the slope of a backlash curve.

Disclosed embodiments provide a new and improved actuator backlash measurement and monitoring system, which may be implemented in an electromechanical system. The following description exemplifies and describes a nonlimiting number of exemplary systems in which the present disclosure may be implemented.

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the actuator backlash measurement and monitoring system of the present disclosure may be implemented in an aircraft driven by a propulsion system, which may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

The aircraft may include an electric engine connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft using at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed above, embodiments of the aircraft may include many movable structural flight elements (e.g., actuators) that allow pilots to safely control the aircraft. Flight control surfaces (e.g., ailerons, elevators, rudders, etc.) are critical to controlling the positioning of the aircraft. Changes to the orientation of these surfaces changes the airflow and pressure distribution around the aircraft, allowing the pilot to control the movement of the aircraft in three axes of rotation. Similarly, rotation and orientation control of propellers may provide lift support (e.g., lift required for vertical take-off, landing, and hovering) and may provide the forward thrust required to move the aircraft through the air. The movement of each of these flight elements is critical to the safety and stability of the aircraft. Therefore, measuring and monitoring backlash in the movable structural flight elements is also critical to the safety of the aircraft.

Figure 4:
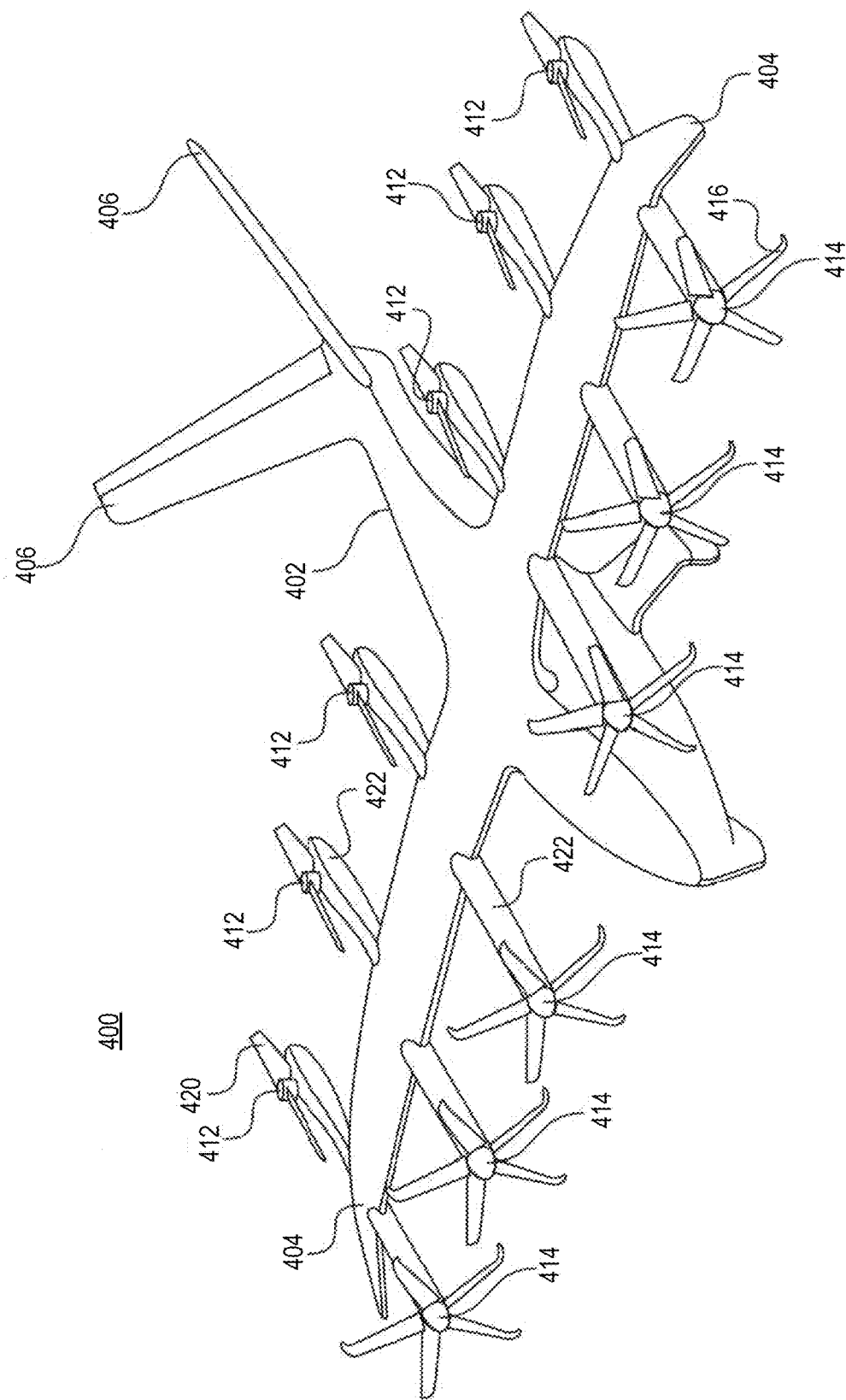
FIG. 4 shows an exemplary VTOL aircraft in the cruise configuration, consistent with disclosed embodiments.
Figure 5:
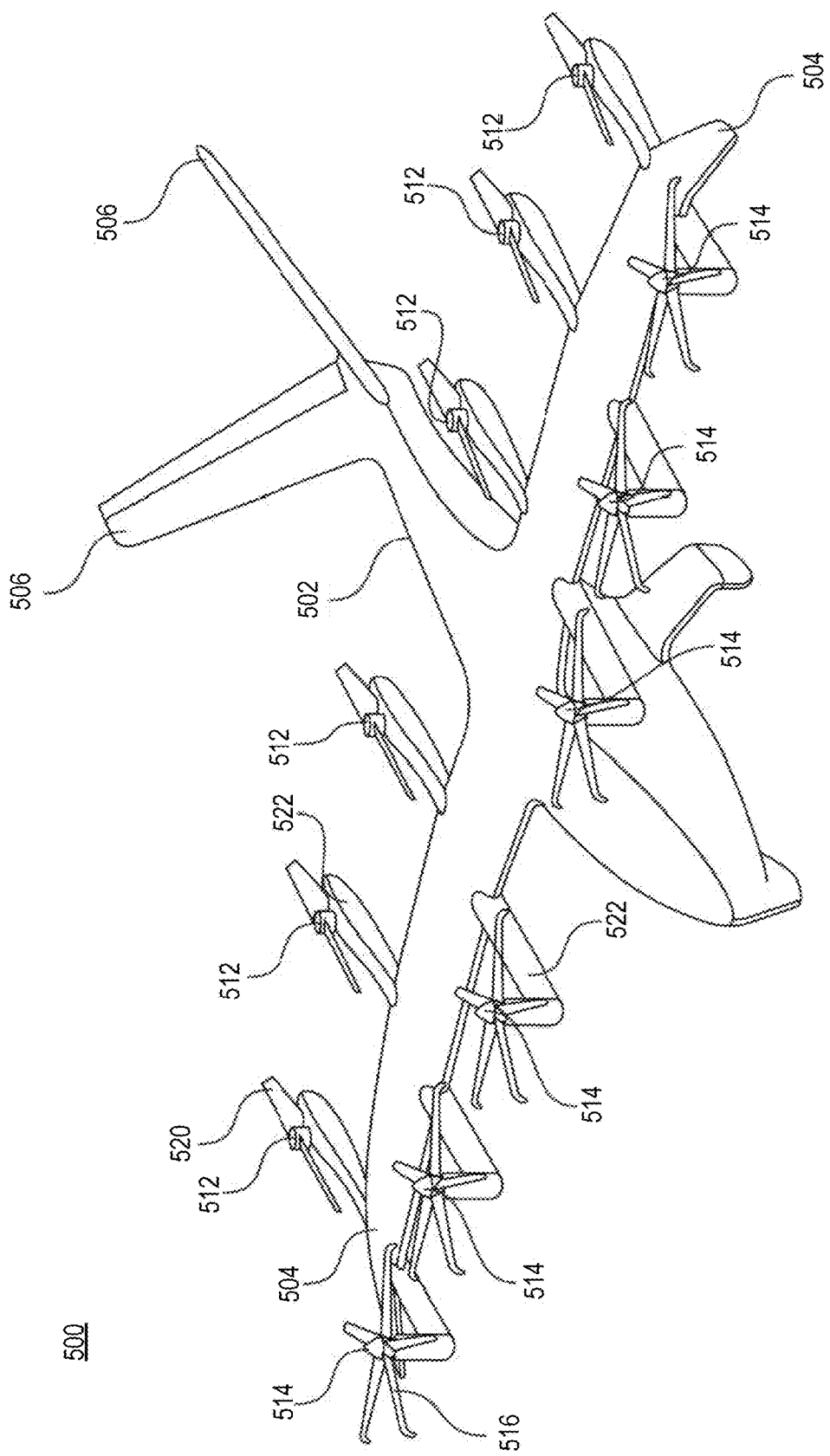
FIG. 5 shows an exemplary VTOL aircraft in the lift configuration, consistent with disclosed embodiments.

FIG. 4 is an illustration of a perspective view of an exemplary VTOL aircraft, consistent with disclosed embodiments. FIG. 5 is another illustration of a perspective view of an exemplary VTOL aircraft in an alternative configuration, consistent with embodiments of the present disclosure. FIGS. 4 and 5 illustrate a VTOL aircraft 400, 500 in a cruise configuration and a vertical take-off, landing and hover configuration (also referred to herein as a "lift" configuration), respectively, consistent with embodiments of the present disclosure. Elements corresponding to FIGS. 4 and 5 may possess like numerals and refer to similar elements of the aircrafts 400, 500. In some embodiments, aircraft 400, 500 may include the actuator backlash measurement and monitoring system and/or method as described above. The aircraft 400, 500 may include a fuselage 402, 502, wings 404, 504 mounted to the fuselage 402, 502 and one or more rear stabilizers 406, 506 mounted to the rear of the fuselage 402, 502. A plurality of lift propellers 412, 512 may be mounted to wings 404, 504 and may be configured to provide lift for vertical take-off, landing and hover. A plurality of tilt propellers 414, 514 may be mounted to wings 404, 504 and may be tiltable (e.g., configured to tilt or alter orientation) between the lift configuration in which they provide a portion of the lift required for vertical take-off, landing and hovering, as shown in FIG. 5, and the cruise configuration in which they provide forward thrust to aircraft 400 for horizontal flight, as shown in FIG. 4. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 412, 512 may be configured for providing lift only, with all horizontal propulsion being provided by the tilt propellers. For example, lift propellers 412, 512 may be configured with fixed positions and may only generate thrust during take-off, landing and hover phases of flight. Meanwhile, tilt propellers 414, 514 may be tilted upward into a lift configuration in which thrust from propellers 414, 514 is directed downward to provide additional lift.

For forward flight, tilt propellers 414, 514 may tilt from their lift configurations to their cruise configurations. In other words, the orientation of tilt propellers 414, 514 may be varied from an orientation in which the tilt propeller thrust is directed downward (to provide lift during vertical take-off, landing and hover) to an orientation in which the tilt propeller thrust is at least partially directed rearward (to provide forward thrust to aircraft 400, 500). The tilt propellers assembly for a particular electric engine may tilt about an axis of rotation defined by a mounting point connecting the boom and the electric engine. When the aircraft 400, 500 is in full forward flight, lift may be provided entirely by wings 404, 504. Meanwhile, in the cruise configuration, lift propellers 412, 512 may be shut off. The blades 420, 520 of lift propellers 412, 512 may be held in low-drag positions for aircraft cruising. In some embodiments, lift propellers 412, 512 may each have two blades 420, 520 that may be locked, for example while the aircraft is cruising, in minimum drag positions in which one blade is directly in front of the other blade as illustrated in FIG. 4. In some embodiments, lift propellers 412, 512 have more than two blades. In some embodiments, tilt propellers 414, 514 may include more blades 416, 516 than lift propellers 412, 512. For example, as illustrated in FIGS. 4 and 5, lift propellers 412, 512 may each include, e.g., two blades, whereas and tilt propellers 414, 514 may each include more blades, such as the five blades shown. In some embodiments, each of the tilt propellers 414, 514 may have 2 to 5 blades, and possibly more depending on the design considerations and requirements of the aircraft.

In some embodiments, the aircraft may include a single wing 404, 504 on each side of fuselage 402, 502 (or a single wing that extends across the entire aircraft). At least a portion of lift propellers 412, 512 may be located rearward of wings 404, 504 (e.g., rotation point of propeller is behind a wing from a bird's eye view) and at least a portion of tilt propellers 414, 514 may be located forward of wings 404, 504 (e.g., rotation point of propeller is in front of a wing from a bird's eye view). In some embodiments, all of lift propellers 412, 512 may be located rearward of wings 404, 504 and all of tilt propellers 414, 514 may be located forward of wings 404, 504. According to some embodiments, all lift propellers 412, 512 and tilt propellers 414, 514 may be mounted to the wings—i.e., no lift propellers or tilt propellers may be mounted to the fuselage. In some embodiments, lift propellers 412, 512 may be all located rearwardly of wings 404, 504 and tilt propellers 414, 514 may be all located forward of wings 404, 504. According to some embodiments, all lift propellers 412, 512 and tilt propellers 414, 514 may be positioned inwardly of the ends of the wing 404, 504.

In some embodiments, lift propellers 412, 512 and tilt propellers 414, 514 may be mounted to wings 404, 504 by booms 422, 522. Booms 422, 522 may be mounted beneath wings 404, 504, on top of the wings, and/or may be integrated into the wing profile. In some embodiments, lift propellers 412, 512 and tilt propellers 414, 514 may be mounted directly to wings 404, 504. In some embodiments, one lift propeller 412, 512 and one tilt propeller 414, 514 may be mounted to each boom 422, 522. Lift propeller 412, 512 may be mounted at a rear end of boom 422, 522 and tilt propeller 414, 514 may be mounted at a front end of boom 422, 522. In some embodiments, lift propeller 412, 512 may be mounted in a fixed position on boom 422, 522. In some embodiments, tilt propeller 414, 514 may mounted to a front end of boom 422, 522 via a hinge. Tilt propeller 414, 514 may be mounted to boom 422, 522 such that tilt propeller 414, 514 is aligned with the body of boom 422, 522 when in its cruise configuration, forming a continuous extension of the front end of boom 422, 522 that minimizes drag for forward flight.

In some embodiments, aircraft 400, 500 may include, e.g., one wing on each side of fuselage 402, 502 or a single wing that extends across the aircraft. According to some embodiments, the at least one wing 404, 504 is a high wing mounted to an upper side of fuselage 402, 502. According to some embodiments, the wings include control surfaces, such as flaps and/or ailerons. According to some embodiments, wings 404, 504 may have a profile that reduces drag during forward flight. In some embodiments, the wing tip profile may be curved and/or tapered to minimize drag.

In some embodiments, rear stabilizers 406, 506 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 412, 512 or tilt propellers 414, 514 may be canted relative to at least one other lift propeller 412, 512 or tilt propeller 414, 514, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 412, 512 and/or tilt propellers 414, 514 may be canted relative to a cabin of the aircraft, such that the rotational axis of the propeller in a lift configuration is angled away from an axis perpendicular to the top surface of the aircraft. For example, in some embodiments, the aircraft is a flying wing aircraft, and some or all of the propellers are canted away from the cabin.

Figure 6:
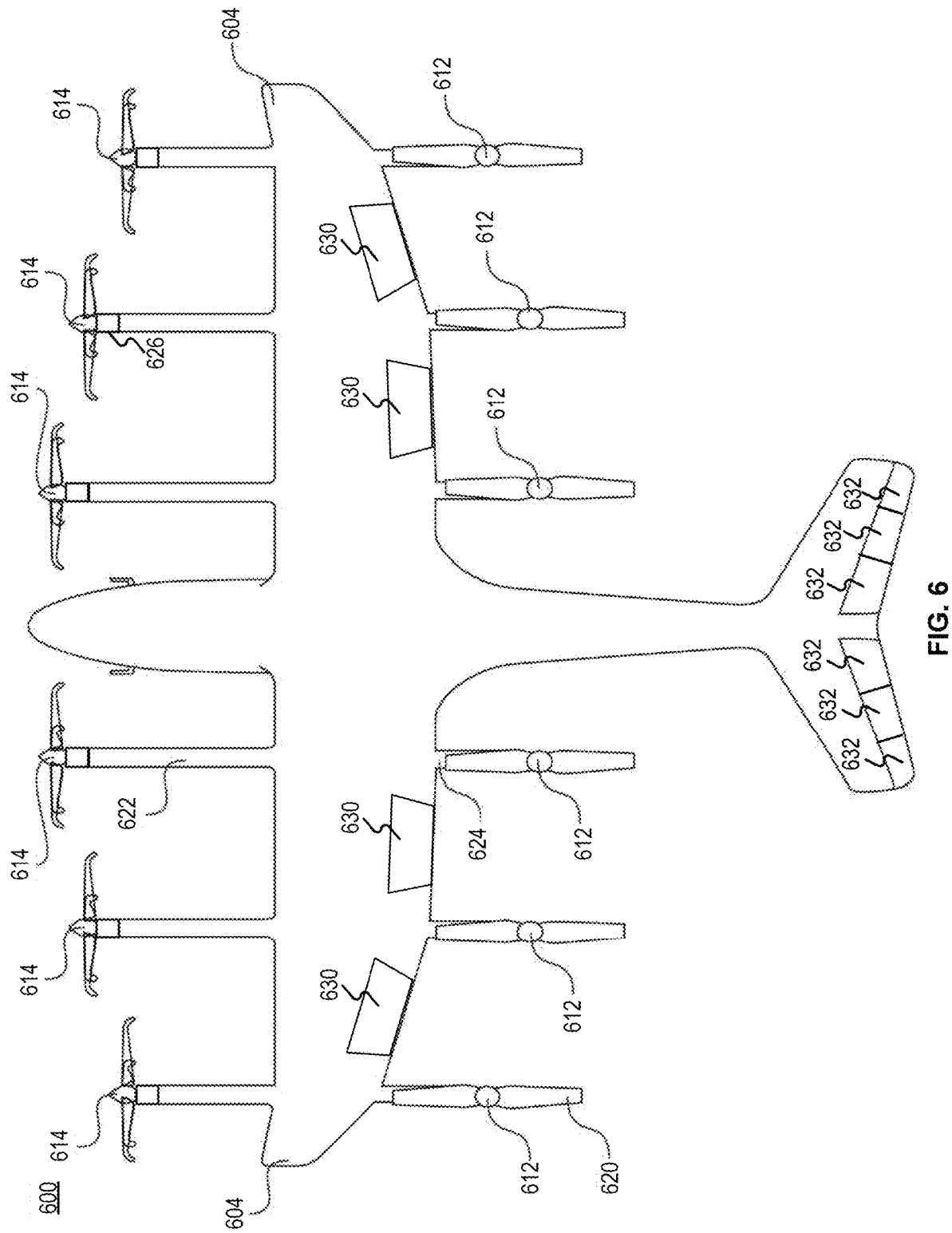
FIG. 6 shows an exemplary top plan view of a VTOL aircraft, consistent with disclosed embodiments.

FIG. 6 is an illustration of a top plan view of an exemplary VTOL aircraft, consistent with embodiments of the present disclosure. Aircraft 600 shown in the figure may be a top plan view of the aircraft 400, 500 shown in FIGS. 4 and 5, respectively, and may similarly implement the actuator backlash measurement and monitoring system and/or method of the present disclosure. As discussed herein, an aircraft 600 may include twelve electric propulsion systems distributed across the aircraft 600. In some embodiments, an electric propulsion system may comprise an EPU and a propeller. In some embodiments, a distribution of electric propulsion systems may include six forward electric propulsion systems 614 and six aft electric propulsion systems 612 mounted on booms forward and aft of the main wings 604 of the aircraft 600. In some embodiments, a length of the rear end of the boom 624, as defined from the wing 604 to a lift propeller, may be similar to the lengths of all rear ends of the booms 624. In some embodiments, the length of the rear ends of the booms may vary, for example, across the six rear ends of the booms. Further, FIG. 6 depicts an exemplary embodiment of a VTOL aircraft 600 with forward propellers (part of electric propulsion system 614) in a horizontal orientation for horizontal flight and aft propeller blades 620 in a stowed position for a forward phase of flight.

In some embodiments, a flight control system may include a system capable of controlling control surfaces and their associated actuators in an exemplary VTOL aircraft. In aircraft 600, the control surfaces may include, in addition to the propeller blades discussed earlier, flaperons 630 and ruddervators 632. Flaperons 630 may combine functions of one or more flaps, one or more ailerons, and/or one or more spoilers. Ruddervators 632 may combine functions or one or more rudders and/or one or more elevators. Additionally or alternatively, control surfaces may include separate rudders and elevators. In aircraft 600, the actuators may include, in addition to the electric propulsion systems discussed earlier, control surface actuators (CSAs) associated with flaperons 630 and ruddervators 632. Although FIG. 6 illustrates twelve EPU inverters and associated propeller blades 612, 614, six tilt propeller actuators (TPAs) 626, four flaperons 630 and associated control surface actuators (CSAs), and six ruddervators 632 and associated CSAs, an aircraft according to various embodiments can have any suitable number of these various elements. In some embodiments, some or all actuators in aircraft 600 may have very small backlash tolerances. Further, some or all actuators in aircraft 600 may be important or essential to regular operations of aircraft 600 while also being timely and costly to repair and/or replace. Therefore, there is a need to measure and monitor actuator backlash in a manner that avoids unnecessary or wasteful repair or replacement of said actuators.

Figure 7:
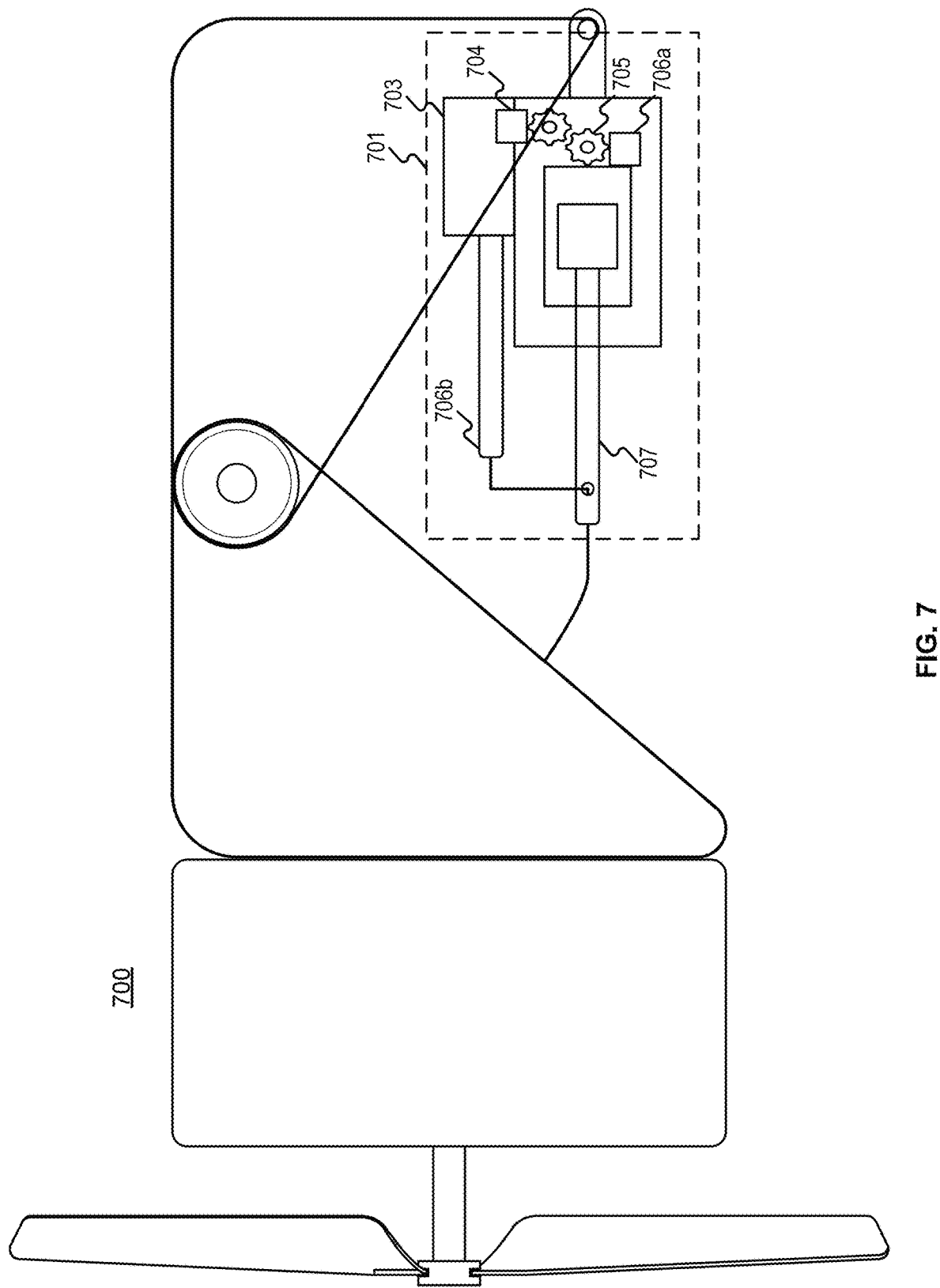
FIGS. 7-9 show exemplary systems with an actuator, consistent with disclosed embodiments.
Figure 8:
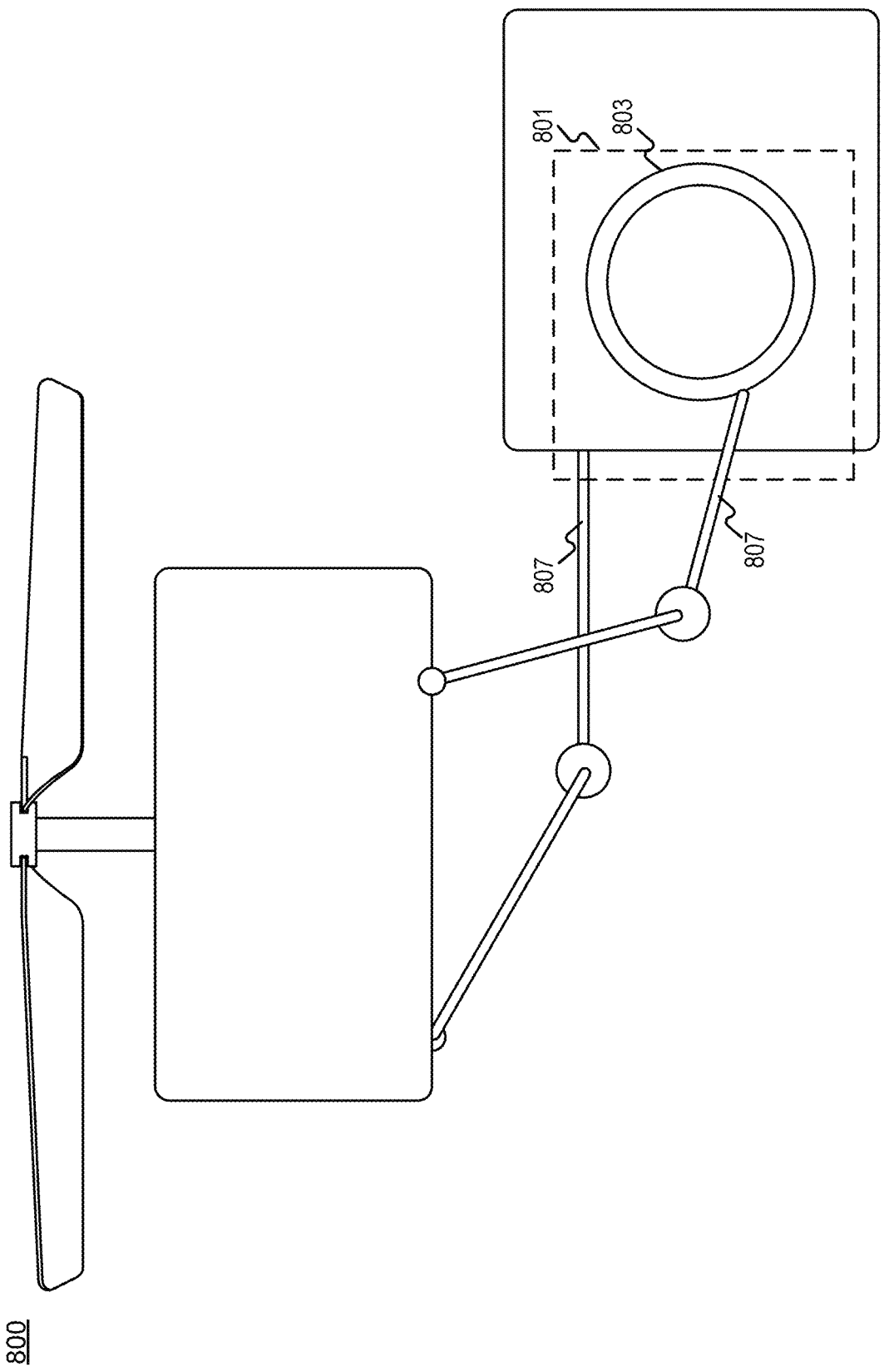
Figure 9:
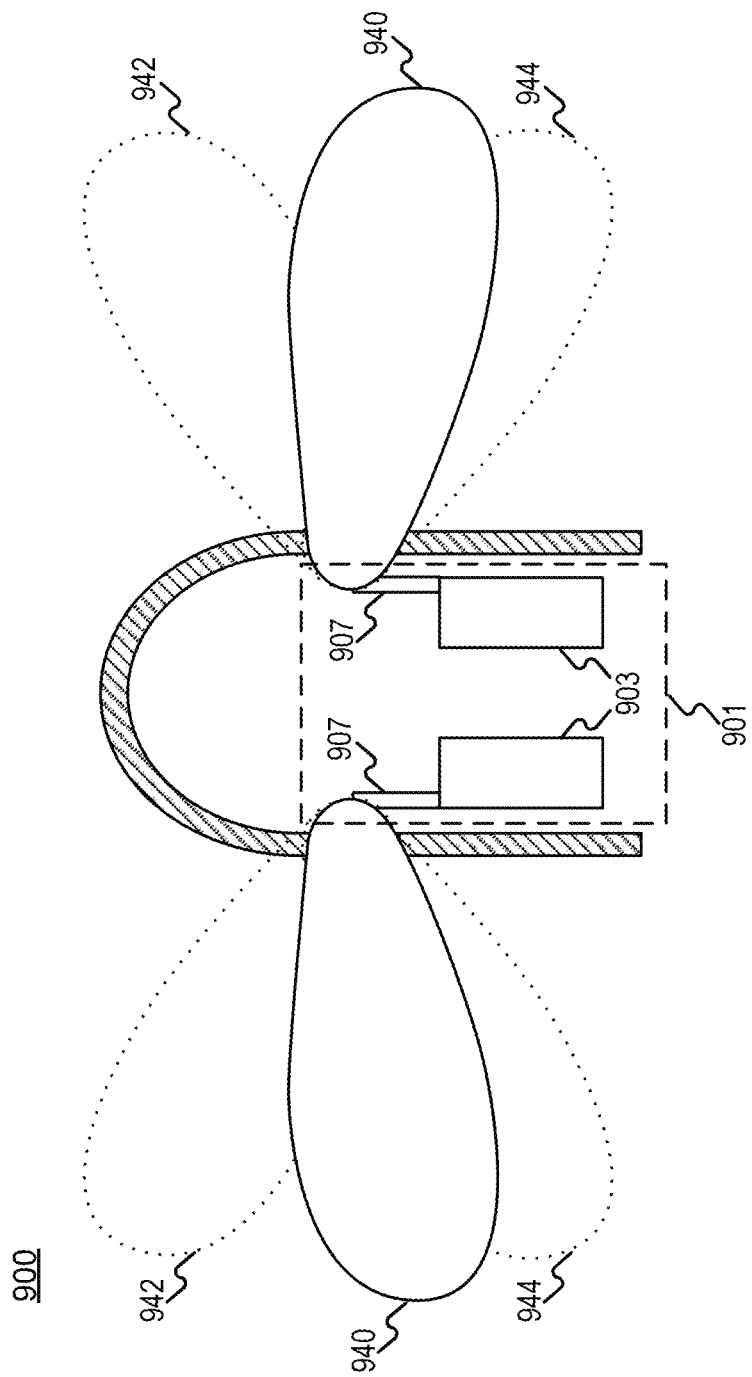

FIGS. 7-9 depict exemplary systems with an actuator, consistent with disclosed embodiments. The systems in FIGS. 7-9 are exemplary and should not be interpreted as representing all of the different types of systems in which the present disclosure may be implemented. In some embodiments, a processor (e.g., a flight control computer) may perform the steps of method 200 on any actuator, such as those depicted in exemplary illustrations FIGS. 7-9 to determine a backlash value associated with said actuator.

FIG. 7 is a TPA 700 with an actuator backlash measurement and monitoring system, consistent with disclosed embodiments. TPA 700 may be a tilt propeller actuator of aircraft 400, 500, 600 shown in FIGS. 4, 5, and 6, respectively. TPA 700 may include an actuator 701. Actuator 701 may include a motor end 703; gears 705; sensors 704 and 706a or 706b; and output end 707. Motor end 703 and output end 707 may correspond to motor end 103 and output end 107 as depicted in FIG. 1. In some embodiments, actuator 701 may adjust TPA 700 between a cruise configuration (as depicted) and a lift configuration.

For example, in some embodiments, actuator 701 is a rotary actuator and includes motor end 703, gears 705, sensors 704 and 706a, and output end 707. Gears 705a may be one or more gears in a gear chain and may correspond to gears 105 as depicted in FIG. 1. Sensors 704 and 706a may be rotation position sensors and may correspond to sensor 104 and sensor 106 as depicted in FIG. 1, respectively.

Further, in some embodiments, actuator 701 is a linear actuator and includes motor 703, a linear screw (not depicted), sensors 704 and 706b, and output end 707. Additionally or alternatively, the linear screw may be a ball screw or any other component or combination of functionally equivalent components in a linear actuator. Sensors 704 and 706b may be position sensors and may correspond to sensor 104 and sensor 106 as depicted in FIG. 1, respectively.

For example, a processor (not depicted) may command actuator 701 to drive motor end 703 to one endpoint (e.g., TPA 700 in cruise configuration) and may command sensors 704 and 706a to measure a motor-end initial position value and an output-end initial position value, respectively. The processor may store the measured initial position values in a memory location. Then the processor may command actuator 701 to drive motor end 703 to another endpoint (e.g., TPA 700 in tilt configuration) and may command sensors 704 and 706a/706b to measure a motor-end final position value and an output-end final position value, respectively. The processor may store the measured final position values in a memory location. Then the processor may determine a backlash value associated with actuator 701 by subtracting each initial position value from its respective final position value and combining the differences together. Then the processor may generate a comparison of the determined backlash value and one or more of predetermined threshold values. Finally, the processor may generate a signal based on the comparison and may display a notification indicative of an operational condition of actuator 701 based on the signal.

FIG. 8 is a TPA 800 with an actuator backlash measurement and monitoring system, consistent with disclosed embodiments. TPA 800 may be a tilt propeller actuator of a VTOL aircraft. TPA 800 may include an actuator 801. Actuator 801 may include a motor end 803, gears (not depicted), two sets of one or more sensors (not depicted), and output ends 807.

For example, in some embodiments, actuator 801 is a linear actuator that, when actuated, may extend or retract output ends 807 to adjust TPA 800 between a cruise configuration and a lift configuration (as depicted). Further, actuator 801 may include one set of two sensors operatively connected to motor end 803 and one output end 807 and may further include another set of two sensors operatively connected to motor end 803 and another output end 807.

For example, a processor (not depicted) may command actuator 801 to drive motor ends 803 to one endpoint (e.g., TPA 800 in tilt configuration) and may command each set of sensors to measure a motor-end initial position value and an output-end initial position value. The processor may store each set of measured initial position values in a memory location. Then the processor may command actuator 801 to drive motor end 803 to another endpoint (e.g., TPA 800 in lift configuration) and may command each set of sensors to measure a motor-end final position value and an output-end final position value. The processor may store each set of measured final position values in a memory location. Then the processor may determine one backlash value associated with actuator 801 and one output end 807 by subtracting, from one set of data, each initial position value from its respective final position value and combining the differences together. Further, the processor may determine a second backlash value associated with actuator 801 and another output end 807 in a similar manner using its respective measured position values. Then the processor may generate a comparison of each of the determined backlash values and one or more of predetermined threshold values. Finally, the processor may generate a signal based on the comparisons and may display a notification indicative of an operational condition of actuator 801 and/or each output end 807 based on the signal.

FIG. 9 is an adjustable rotor blade system 900 with an actuator backlash measurement and monitoring system, consistent with disclosed embodiments. In some embodiments, adjustable rotor blade system 900 may be part of a VTOL rotor system and may include actuator 901. Actuator 901 may include motors 903, gears (not depicted), two sets of one or more sensors (not depicted), and output ends 907. Additionally or alternatively, in some embodiments, adjustable blade system 900 may include one or more adjustable rotor blades. In some embodiments, adjustable rotor blade system 900 may include two rotor blades 940 that may be tilted or adjusted by actuator 901. Further, in some embodiments, each rotor blade 940 may be operatively connected to an output end 907.

For example, a processor (e.g., a flight control computer) may command actuator 901 to adjust one or both rotor blades 940 to a position 942 and/or position 944. Rotor blades 940 may be tilted or adjusted in response to commands from a flight control computer to affect the roll, pitch, yaw, and/or thrust of the VTOL aircraft. Further, actuator 901 may include one set of two sensors operatively connected to one motor end 903 and one output end 907 and may further include another set of two sensors operatively connected to another motor end 903 and another output end 907.

For example, a processor (not depicted) may command actuator 901 to drive motor ends 903 to one endpoint (e.g., rotor blades 940 to positions 942) and may command each set of sensors to measure a motor-end initial position value and an output-end initial position value. The processor may store each set of measured initial position values in a memory location. Then the processor may command actuator 901 to drive motor ends 903 to another endpoint (e.g., rotor blades 940 to positions 944) and may command each set of sensors to measure a motor-end final position value and an output-end final position value. The processor may store each set of measured final position values in a memory location. Then the processor may determine one backlash value associated with actuator 901 and one output end 907 by subtracting, from one set of data, each initial position value from its respective final position value and combining the differences together. Further, the processor may determine a second backlash value associated with actuator 901 and another output end 907 in a similar manner using its respective measured position values. Then the processor may generate a comparison of each of the determined backlash values and one or more of predetermined threshold values. Finally, the processor may generate a signal based on the comparisons and may display a notification indicative of an operational condition of actuator 901 and/or each output end 907 based on the signal.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

The term "processor," as used herein, refers to one or more processors. The disclosed systems may be implemented in part or in full on various computers, electronic devices, computer-readable media (such as CDs, DVDs, flash drives, hard drives, or other storage), or other electronic devices or storage devices. The methods and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein. It is also intended that the sequence of steps shown in figures is only for illustrative purposes and is not intended to be limited to any particular sequence of steps. As such, those skilled in the art can appreciate that these steps can be performed in a different order while implementing the same method.

What is claimed is:

1. A method for backlash measurement of an actuator for an aircraft, the actuator comprising a motor end and an output end, the method comprising:
   driving the motor end of the actuator to one endpoint;
   measuring, using a sensor, an output-end initial position value associated with the output end of the actuator;

determining a first difference between the output-end initial position value and a motor-end initial position value, the motor-end initial position value being associated with the motor end of the actuator;
driving the motor end of the actuator to another endpoint;
determining, using the sensor or another sensor, an output-end final position value associated with the output end of the actuator;
determining a second difference between the output-end final position value and a motor-end final position value, the motor-end final position value being associated with the motor end of the actuator;
determining a backlash value of the actuator by combining the first difference and the second difference;
generating a comparison of the backlash value and at least one predetermined threshold;
generating a signal based on the comparison; and
displaying, on a display device, a notification indicative of an operational condition of the actuator based on the signal.

2. The method of claim 1, wherein combining the first difference and the second difference includes adding the first difference and the second difference.

3. The method of claim 1, wherein the sensor is an output-end sensor and the method further includes determining the motor-end initial position value and the motor-end final position value using a motor-end sensor.

4. The method of claim 3, wherein the output-end sensor is operatively connected to one end of a gear train of the actuator and the motor-end sensor is operatively connected to another end of the gear train of the actuator.

5. The method of claim 3, wherein the output-end sensor is operatively connected to one end of a screw of the actuator and the motor-end sensor is operatively connected to another end of the screw of the actuator.

6. The method of claim 1, wherein the at least one predetermined threshold comprises:
a first predetermined threshold; and
a second predetermined threshold greater than the first predetermined threshold.

7. The method of claim 6, wherein the first predetermined threshold is associated with the operational condition indicating that the actuator is acceptable for use.

8. The method of claim 7, wherein the second predetermined threshold is associated with the operational condition indicating that the actuator is not acceptable for use.

9. The method of claim 6, wherein the at least one predetermined threshold is determined based on at least one of historical data or model simulation.

10. The method of claim 1, wherein the signal includes a command to prevent the aircraft from taking off or flying.

11. The method of claim 1, further comprising backlash monitoring of the actuator.

12. A system for backlash measurement of an actuator for an aircraft, the actuator comprising a motor end and an output end, the system comprising:
a first sensor associated with the output end;
a second sensor associated with the motor end;
at least one processor; and
at least one non-transitory computer-readable medium containing instructions that, when executed by the at least one processor, causes the at least one processor to perform operations comprising:
driving the motor end of the actuator to one endpoint;
determining, based on the first sensor and the second sensor, a first difference between an output-end initial position and a motor-end initial position;
determining a second difference between an output-end final position and a motor-end final position,
wherein
the output-end initial position and the output-end final position are associated with the output end of the actuator, and
the motor-end initial position and the motor-end final position are associated with the motor end of the actuator;
determining a backlash value of the actuator by combining the first difference and the second difference;
generating a comparison of the backlash value and at least one predetermined threshold;
generating a signal based on the comparison; and
displaying, on a display device, a notification indicative of an operational condition of the actuator based on the signal.

13. The system of claim 12, wherein the first sensor is operatively connected to one end of a gear train of the actuator and the second sensor is operatively connected to another end of the gear train of the actuator.

14. The system of claim 12, wherein the first sensor is operatively connected to one end of a screw of the actuator and the second sensor is operatively connected to another end of the screw of the actuator.

15. The system of claim 12, wherein the at least one predetermined threshold comprises:
a first predetermined threshold; and
a second predetermined threshold greater than the first predetermined threshold.

16. The system of claim 15, wherein the first predetermined threshold is associated with the operational condition indicating that the actuator is acceptable for use.

17. The system of claim 16, wherein the second predetermined threshold is associated with the operational condition indicating that the actuator is not acceptable for use.

18. The system of claim 12, wherein the at least one predetermined threshold is determined based on at least one of historical data or model simulation.

19. The system of claim 12, wherein the signal includes a command to prevent the aircraft from taking off or flying.

20. A method for backlash measurement of an actuator, the actuator comprising a motor end and an output end, comprising:
driving the motor end of the actuator to one endpoint;
determining a first difference between an output-end initial position and a motor-end initial position, the output-end initial position being associated with the output end of the actuator and the motor-end initial position being associated with the motor end of the actuator;
driving the motor end of the actuator to another endpoint;
determining a second difference between an output-end final position and a motor-end final position, the output-end final position being associated with the output end of the actuator and the motor-end final position being associated with the motor end of the actuator;
determining a backlash value of the actuator based on the first difference and the second difference;
generating a comparison of the backlash value and at least one predetermined threshold;
generating a signal based on the comparison; and
displaying, on a display device, a notification indicative of an operational condition of the actuator based on the signal.

21. The method of claim 20, further comprising determining the output-end initial position and the output-end final position using a first sensor associated with the output end.

22. The method of claim 21, further comprising determining the motor-end initial position and the motor-end final position using a second sensor associated with the motor end.

23. The method of claim 22, wherein the first sensor is operatively connected to one end of a gear train of the actuator and the second sensor is operatively connected to another end of the gear train of the actuator.

24. The method of claim 22, wherein the first sensor is operatively connected to one end of a screw of the actuator and the second sensor is operatively connected to another end of the screw of the actuator.

25. The method of claim 20, wherein the at least one predetermined threshold comprises:

a first predetermined threshold; and a second predetermined threshold greater than the first predetermined threshold.

26. The method of claim 25, wherein the first predetermined threshold is associated with the operational condition indicating that the actuator is acceptable for use.

27. The method of claim 25, wherein the second predetermined threshold is associated with the operational condition indicating that the actuator is not acceptable for use.

28. The method of claim 20, wherein the at least one predetermined threshold is determined based on at least one of historical data or model simulation.

29. The method of claim 20, wherein determining the backlash value includes adding the first difference and the second difference.

30. The method of claim 20, further comprising backlash monitoring of the actuator.

* * * * *